8511X
S. Lamson,
Bending Wood.
Patented Nov. 25, 1834.
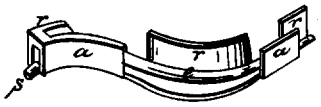
A.M. PHOTO-LITHO. CO. N.Y. (OSBORNE'S PROCESS)

for [illegible] [illegible] Pat [illegible] Page 5. Nov 25. 1835 } Nov 25 1834 [illegible] 431

Silas Lamson of Sterling State of Massachusetts

Letters Patent

The schedule referred to in these Letters Patent and making part of the same, containing a description in the words of the said Silas Lamson himself, of his improvement, in the method of fastening Scythes to snaths, by means of nuts and screws To all to whom these presents shall come.

Be it known that I Silas Lamson, of Sterling in the County of Worcester and Commonwealth of Massachusetts, have invented a new and useful improvement in the method of fastening Scythes to snaths, by means of nuts and screws, and that the following is a full and exact description thereof.

The chief object of my improvement consists in diminishing the weight of the scythe. The Scythes now used are constructed with a shank which being bent at the end enters a mortis made in the snath to receive it, But by my method of fastening the Scythe, two inconveniences which now exist are avoided to wit. The weaking the snath by the mortis above referred to, and the weight of the Scythe, The difference in the weight of the Scythes employed in mowing grass. is very inconsiderable and it is an important point to so construct the Scythe, that it shall possess the greater strength or stiffness with the smallest possible weight, even a few ounces saved in this way is an essential advantage, Scythes are now fastened to the snath by means of a ring and wedge, By my plan the wedge is dispensed with and a ring of smaller weight than that now used substituted, so that my improvement refers as well to the ring as to the scythe, There are different methods by which my object may be affected as will be shown hereafter, but in which the principle is the same, In the first figure of the drawing, is a plain iron ring with two mortises, one upon Drawing each side These mortises are opposite to each other, the ring is firmly fixed to the end of the snath, and a mortise is made through the snath, to correspond with those in the ring these mortises are not exactly through the centre of the ring, but as the ring is fixed on the snath, the mortises are nearer the lower than the upper side, The shank of the scythe to accommodate the ring is made, straight, and passes through the ring and snath, and is confined in its place by means of a nut upon the end of the shank, the scythe may be made to hang in or out by the help of a small key or wedge Fig 2, represents a ring with a shank projecting beyond the lower end of the snath, with a mortise in this shank to receive the shank of the scythe in the manner of a mortise and tenon The scythe is confined here by means of a nut Fig 3. represents a ring with a shank. extending below the heel of the snath, made to pass through a mortise in the shank of the scythe and confined also with a nut, Fig 4 represents a ring with a shank to which the shank of the scythe is fastened by means of screws, The holes in the shank of the ring are slots, so that the scythe may be made to hang out, or in as may be desired —

In all these methods the rings are made fast to the snath, and by the help of nuts the scythe may be fastened with less trouble and more permanently, than by the manner which has been common heretofore,

What I claim as my improvement is the manner of fastening the scythe to the snath above described

Witnesses

Charles Hardy
Augustus [illegible]

Silas Lawson

R.J.W.

[illegible]

([illegible] 25 1834)